United States Patent [19]

Imoto et al.

[11] Patent Number: 4,904,037
[45] Date of Patent: Feb. 27, 1990

[54] WAVEGUIDE TYPE OPTICAL DEVICE WITH THERMAL COMPENSATION LAYERS

[75] Inventors: Katsuyuki Imoto, Sayama; Hirohisa Sano, Kokubunji; Yasuo Hira, Yokohama, all of Japan

[73] Assignee: Hitachi, Ltd., Tokyo, Japan

[21] Appl. No.: 226,014

[22] Filed: Jul. 28, 1988

[30] Foreign Application Priority Data

Aug. 28, 1987 [JP] Japan .................................. 62-212760

[51] Int. Cl.$^4$ ................................................ G02B 6/10
[52] U.S. Cl. .................................. 350/96.12; 350/96.11
[58] Field of Search ............... 350/96.10, 96.11, 96.12, 350/96.13, 96.14, 96.17

[56] References Cited

U.S. PATENT DOCUMENTS

| 4,017,341 | 4/1977 | Suzuki et al. | 148/174 |
| 4,253,739 | 3/1981 | Carlson | 350/310 |
| 4,523,802 | 6/1985 | Sakaguchi et al. | 350/96.12 |
| 4,750,800 | 6/1988 | Fournier et al. | 350/96.11 |
| 4,775,208 | 10/1988 | Robinson et al. | 350/96.14 |
| 4,796,975 | 1/1989 | Lukas et al. | 350/96.11 X |

FOREIGN PATENT DOCUMENTS 60-254102 12/1985 Japan .................................. 350/96.11

OTHER PUBLICATIONS

"Recent Optical Waveguide Technology", No. 78-O plus E, May 1986, p. 63, Fig. 3.

Primary Examiner—John D. Lee
Assistant Examiner—Brian M. Healy
Attorney, Agent, or Firm—Pennie & Edmonds

[57] ABSTRACT

A waveguide type optical device in which a waveguide layer for propagating light is provided on the front surface of a substrate, and a compensation layer having a coefficient of thermal expansion substantially equal to that of the waveguide layer formed on the front surface is provided on the rear surface of the substrate.

5 Claims, 3 Drawing Sheets

WAVEGUIDE TYPE OPTICAL DEVICE WITH THERMAL COMPENSATION LAYERS

BACKGROUND OF THE INVENTION

The present invention relates to a waveguide type optical device which is virtually insensitive to temperature change.

With the progress of optical fiber communications, mass productivity, high reliability, dispensing with the adjustments of coupling, automatic assemblage, the lowering of loss, etc. have been required of optical devices, and an optical device of the waveguide type has come into the limelight in order to solve these difficulties.

Among optical waveguides, a silica-based glass optical waveguide is of low loss and also exhibits a slight loss of connection with an optical fiber, so that it is deemed promising as a future optical waveguide. A method of manufacturing the silica based glass optical waveguide has heretofore been a method employing flame hydrolysis deposition as shown in "Recent Optical Waveguide Technology," O plus E, May 1986, p. 63, FIG. 3. It is realized by the formation of a porous silica glass film on a silicon substrate, as well as the formation of a porous silica glass film containing a refractive index-controlling dopant (Ti or Ge), on the first-mentioned film (FIG. 6A of the accompanying drawings), the formation of planar optical waveguide films by annealing the porous films so as to become transparent (FIG. 6B), the formation of a three-dimensional optical waveguide by patterning (FIG. 6C), the formation of a porous silica glass film (cladding material) on the three-dimensional optical waveguide (FIG. 6D), and annealing the cladding material so as to become transparent (FIG. 6E).

With the construction of FIGS. 6A–6E, on a silicon substrate 1, there is formed a buffer layer (SiO$_2$) 2 which has a coefficient of thermal expansion ($5.8 \times 10^{-7}$/°C.) considerably differing from that ($4.2 \times 10^{-6}$/°C.) of the silicon substrate, and which is further overlaid with a core layer 7 (a coefficient of thermal expansion: about $4 \times 10^{-7}$/°C.) and a cladding layer 4 (a coefficient of thermal expansion: $5.8 \times 10^{-7}$/°C.). With this construction, however, the coefficients of thermal expansion of the substrate 1 and the glass film 5 formed thereon are too different, so that a residual stress appears within the glass film during the formation thereof. It has been revealed that, for this reason, the following problems are involved: Due to a thermal stress, the so-called index anisotropy that the refractive index of the waveguide in the X-direction thereof and the refractive index thereof in the Y-direction thereof are unequal develops, so light propagation characteristics fluctuate depending upon the direction of an input polarization plane. The warp of the substrate attributed to the difference of the coefficients of thermal expansion appears during the operation of rendering the glass film transparent and after the end thereof, to degrade the light propagation characteristics of the waveguide or to make the packaging thereof difficult. When the glass film thickens due to the residual stress, it cracks and breaks.

SUMMARY OF THE INVENTION

An object of the present invention is to provide a waveguide type optical device which can solve the aforementioned problems.

The above object is accomplished in such a way that a film which has a coefficient of thermal expansion substantially equal to that of a film formed on the front surface of a substrate and which serves as a compensation layer is formed on the rear surface of the substrate.

According to this construction, the distribution of the coefficients of thermal expansion is nearly symmetrical with respect to substantially the middle of the substrate in the thickness direction thereof, so that the substrate does not warp due to temperature fluctuations. Since no change in structural dimensions is consequently involved, fluctuations in light transmission characteristics do not occur. Since the substrate does not warp during a high-temperature annealing treatment, either, the light propagation characteristics are not degraded by this treatment. Further, owing to the construction in which the distribution of the coefficients of thermal expansion is nearly symmetrical with respect to substantially the middle of the substrate in the thickness direction thereof, even when thermal stresses develop, they fall into a nearly symmetrical distribution, too. Accordingly, the anisotropy of refractive indices is sharply reduced.

DESCRIPTION OF THE PREFERRED EMBODIMENTS

Figure 1A:
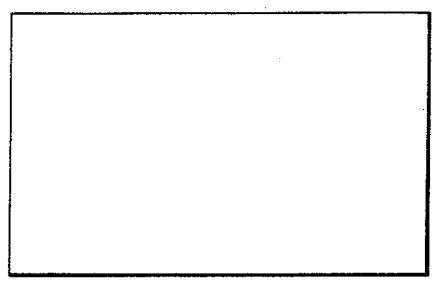
FIGS. 1A and 1B and FIGS. 2A and 2B are schematic views of embodiments of waveguides according to the present invention, respectively.
Figure 1B:
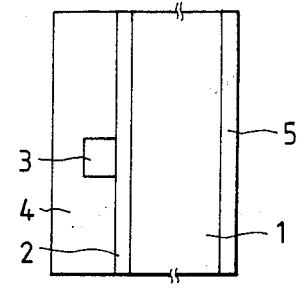

FIGS. 1A and 1B show schematic views of a waveguide according to the present invention. FIG. 1A is a front view, while FIG. 1B is a side view. This embodiment is an example of a rectilinear waveguide. On a substrate (which was of Si and was about 0.4 mm thick in this case) 1, a SiO$_2$ film was formed to a thickness of about 10 μm as a buffer layer 2, which was overlaid with a rectangular core layer 3 (for example, a glass layer which was made of SiO$_2$ doped with several mol-% of TiO$_2$ and which had a thickness of about 8 μm and a width of about 10 μm). In addition, a cladding layer 4 (an SiO$_2$ glass film which had a thickness of about 15 μm) was formed on the whole front surface of the resulting waveguide including the core layer 3. The structure thus far described is the prior-art construction. The present invention consists in that a compensation layer 5 was further provided on the rear surface of the substrate 1 in this structure. In this case, an SiO$_2$ film made of the same composition as that of the buffer layer 2 was formed to a thickness of about 10 μm as the compensation layer 5. Owing to the formation of this compensation layer 5, the warp of the substrate 1 was sharply reduced. Next, a concrete example of this waveguide will be explained. The front surface and rear surface of a Si substrate 2 inches in diameter and 0.4 mm in thickness were respectively provided with oxide films (SiO$_2$) each being about 10 μm thick by thermal oxidation with water vapor (at a temperature of about 1200° C.). The SiO$_2$ film on the rear surface of the Si substrate 1 was to be used as a compensation layer 5, and the SiO$_2$ film on the front surface as a buffer layer 2. Subsequently, a film of SiO$_2$ containing TiO$_2$ was formed on the whole upper surface of the buffer layer 2 to a thickness of about 8.4 μm by sputtering. The doping amount of the TiO$_2$ in the SiO$_2$ was about 1.2 mol-%. After the above film had been formed, it was annealed at a temperature of about 1200° C. for about 1 hour, thereby to obtain a TiO$_2$-doped SiO$_2$ film having a thickness of about 8 μm (which exhibited a refractive index value of 1.4622 for a wavelength of 0.52 μm). At the next step, the TiO$_2$-doped SiO$_2$ film was patterned by a process such as photolithography or dry etching, thereby to prepare a core layer 3 made of a waveguide rectangle which was about 10 μm wide and about 8 μm thick. On the whole front surface of the waveguide formed with the core layer 3, an SiO$_2$ film was formed to a thickness of about 15 μm. This SiO$_2$ film was realized by the flame hydrolysis deposition in the prior art. When measured, the warp of this waveguide was hardly observed. The cracks of the glass film did not appear during the above process, either.

Figure 2A:
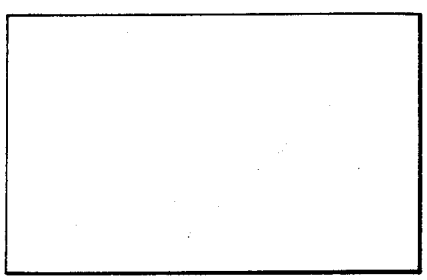
Figure 2B:
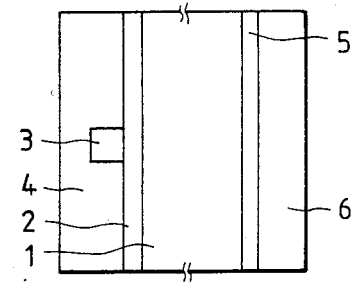

FIGS. 2A and 2B show another embodiment of the waveguide of the present invention. This embodiment is also an example of a rectilinear waveguide, and FIG. 2A is a front view, while FIG. 2B is a side view. In this example, a compensation layer 6 for a cladding layer 4 was further provided on a compensation layer 5. The coefficient of thermal expansion of the compensation layer 6 was substantially equalized to that of the cladding layer 4. Accordingly, the distribution of the coefficients of thermal expansion of this waveguide was nearly symmetric in the thickness direction of a substrate 1 with respect to the middle thereof.

Figure 3A:
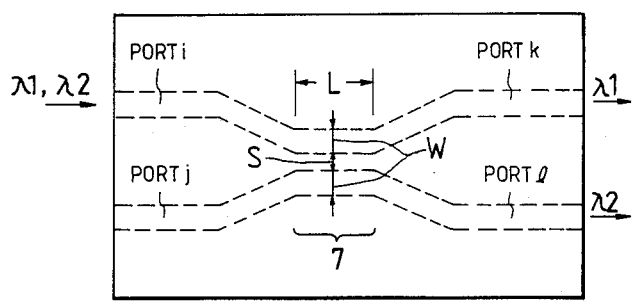
FIGS. 3A and 3B are schematic views of an embodiment of a directional coupler constructed using the waveguide of the present invention.
Figure 3B:
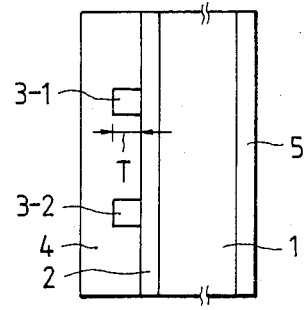

FIGS. 3A and 3B show an embodiment of a directional coupler constructed using the waveguide of the present invention. Light signals of wavelengths $\lambda_1$ and $\lambda_2$ having entered a port i are subjected to distributive optical coupling in a coupling portion 7, whereupon the light signal of the wavelength $\lambda_1$ is guided to the side of a port k, and the light signal of the wavelength $\lambda_2$ to the side of a port l. The branching characteristics here are governed by the coupling length L and coupling spacing S of the coupling portion 7; the width W, thickness T and refractive index $n_c$ of each of core layers 3-1 and 3-2; the refractive index $n_{cl}$ of a cladding layer 4; the refractive index $n_b$ of a buffer layer 2; etc. In other words, the deviations or fluctuations of the quantities S, W, T, $n_c$, $n_{cl}$, $n_b$, etc. shift the center wavelength of the branching characteristics. With the prior-art construction not having a compensation layer 5, when the temperature changed from 0° C. to +60° C., the center wavelength fluctuated several tens nm. This will be ascribable to the fact that the shape of the waveguide was elongated and contracted by the differences of the coefficients of thermal expansion, so the size of the waveguide fluctuated. It was also revealed that, due to the warp of a substrate 1 in the process for fabricating the waveguide, the size of the waveguide deviated, so a shift from designed branching characteristics arose. Further, it was revealed that the optical branching characteristics changed depending upon the polarization planes of the light signals which entered the port i. That is, it was revealed that the coupling characteristics in the coupling portion 7 changed depending upon the polarization planes of the input light signals, so the center wavelength of the branching characteristics shifted. The shift of the center wavelength was also caused by temperature characteristics. In contrast, with the construction of the present invention which was provided with the compensation layer 5, the fluctuation of the center wavelength decreased to about 1/5 or less for the temperature change mentioned before. Also the shift of the center wavelength attributed to the deviation of the size of the waveguide during the fabrication thereof could be suppressed to or below about ½. Further, the fluctuation of the coupling characteristics depending upon the polarization planes decreased. Thus, the overall fluctuation of the center wavelength could be rendered 10 nm or less.

Figure 4A:
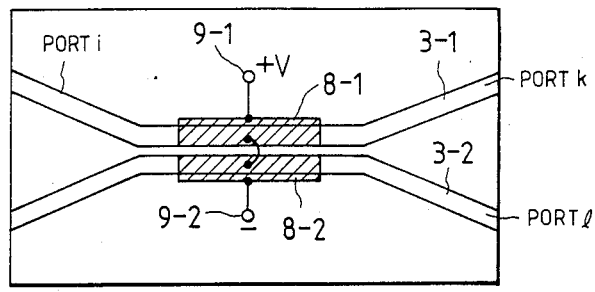
FIGS. 4A and 4B are schematic views of an embodiment of a directional coupler type modulator/switch similarly constructed.
Figure 4B:
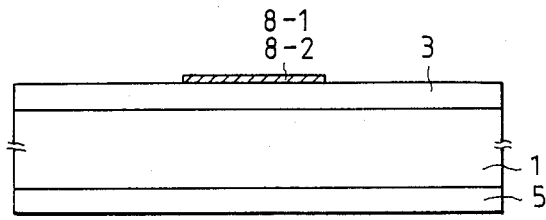

FIGS. 4A and 4B show an embodiment of a directional coupler type modulator/switch constructed using the waveguide of the present invention, and FIG. 4A is a front view, while FIG. 4B is a side view. This embodiment consists in that planar electrodes 8-1 and 8-2 are arranged in the coupling region of a directional coupler. When a voltage V is applied across the electrodes, the difference $\Delta\beta$ of propagation constants arises between guided lights which are propagated through two waveguide cores 3-1 and 3-2. More specifically, $\Delta\beta = 0$ for $V = 0$ turns into:

$\Delta\beta = |\beta_a - \beta_b|$ for $V = V_o$

Here, $\beta_a$ and $\beta_b$ denote the propagation constants of the light signals propagated within the core layers 3-1 and 3-2, respectively. As understood from the above expressions, a light signal having entered a port i can be delivered to either a port k or a port l by controlling the value $V_o$, whereby the embodiment can be endowed with a switching function. If, in this construction, a compensation layer 5 is not provided, the characteristics of the light signal to be delivered to the port k or the port l fluctuate due to a temperature change as stated before, whereas the fluctuation can be suppressed by the compensation layer 5.

Figure 5A:
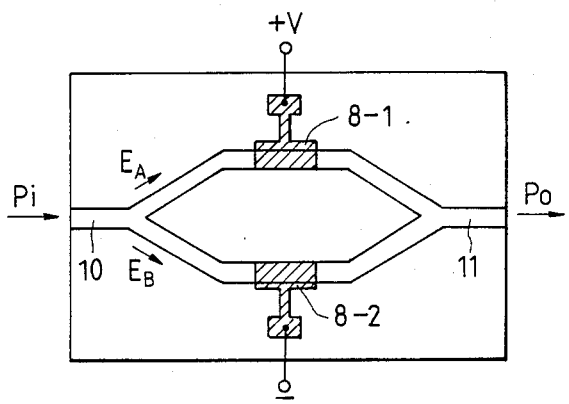
FIGS. 5A and 5B are schematic views of an embodiment of a branching interference type optical modulator similarly constructed.
Figure 5B:
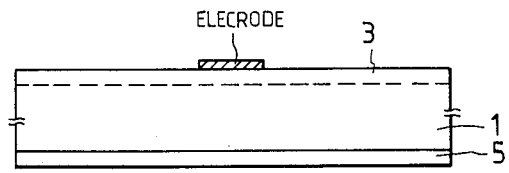
Figure 6A:
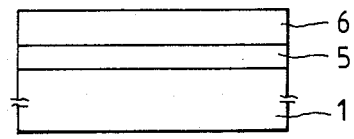
FIGS. 6A thru 6E are schematic views of a method of manufacturing a prior-art optical waveguide.
Figure 6B:
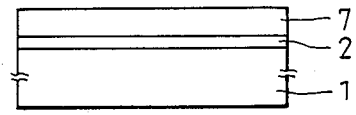
Figure 6C:
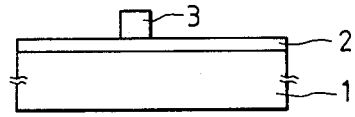
Figure 6D:
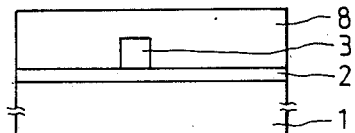
Figure 6E:
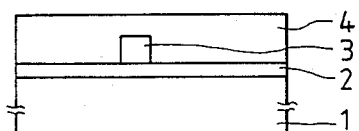

FIGS. 5A and 5B show an embodiment of a branching interference type optical modulator constructed using the waveguide of the present invention, and FIG. 5A is a front view, while FIG. 5B is a side view. A light signal having entered an input port 10 is divided into two equal parts by branching on an input side. For example, guided light which is propagated through an upper waveguide path is subjected to a phase change $\Delta\theta$ by an externally applied voltage V. When the resulting guided light is combined with reference guided light having passed through a lower waveguide path so as to interfere by branching on an output side, an output light intensity changes in correspondence with the phase difference $\Delta\theta$ between both the light signals. Here, when Z-cut LiNbO$_3$ is employed and has its TM mode excited, the guided lights are respectively subjected to phase changes of $\Delta\theta$ and $-\Delta\theta$ by the upper and lower waveguide paths, and the phase difference between both the guided lights becomes 2 $\Delta\theta$. That is, a push-pull operation is possible, and optical modulation can be efficiently performed. Without a compensation layer 5, the above angle $\Delta\theta$ fluctuates depending upon temperatures, so degradation in the signal-to-noise ratio is incurred, whereas the degradation can be suppressed in the construction of this embodiment.

The present invention is not restricted to the foregoing embodiments. The substrate may well be glass such as of GaAs, InP, LiNbO$_3$ or SiO$_2$, apart from Si. Apart from the glass film, each of the films which are formed on the front and rear surfaces of the substrate may well be a plastics film, a magnetic substance film, a crystal film (of, for example, InGaAsP, InGaAlAs or GaAlAs), a metal film, any combination of these films, or the like. The compensation layer may be formed, not only on the whole rear surface of the substrate, but also on a part of the rear surface. Besides, the compensation layer may be formed into one or more layers.

According to the present invention, a film which has a coefficient of thermal expansion substantially equal to that of a film to be formed on the front surface of a substrate and which serves as a compensation layer is formed on the rear surface of the substrate. Therefore, the invention can produce the very useful effects that the fluctuation of light propagation characteristics attributed to a thermal stress can be reduced, that the warp of a substrate during the formation of a film can be suppressed small, and that the appearance of cracks ascribable to a residual stress can be lessened.

We claim:

1. A waveguide type optical device comprising:
   a substrate;
   a buffer layer formed on a front surface of the substrate, having a coefficient of thermal expansion considerably different from that of the substrate;
   a core layer formed on the buffer layer, having a coefficient of thermal expansion smaller than that of the buffer layer;
   a cladding layer formed on at least said core layer, having a coefficient of thermal expansion larger than that of said core layer; and
   a first compensation layer formed on a rear surface of the substrate, having a coefficient of thermal expansion substantially equal to that of said buffer layer.

2. A waveguide type optical device according to claim 1, further comprising a second compensation layer formed on said first compensation layer, having a coefficient of thermal expansion substantially equal to that of said cladding layer.

3. A waveguide type optical device according to claim 1, wherein each of said layers formed on the front and rear surfaces of said substrate is made of one member selected from the group comprising a glass film, a plastics film, a magnetic substance film, a crystal film, a metal film, and a combination of these films.

4. A waveguide type optical device according to claim 1, wherein a coefficient of thermal expansion of said cladding layer is equal to that of said buffer layer.

5. A waveguide type optical device comprising:
   a substrate;
   a buffer layer formed on a front surface of said substrate, having a coefficient of thermal expansion considerably different from that of said substrate;
   a core layer disposed in said buffer layer, having a coefficient of thermal expansion smaller than that of said buffer layer; and
   a compensation layer formed on a rear surface of said substrate, having a coefficient of thermal expansion substantially equal to that of said buffer layer.

* * * * *